(12) United States Patent
Brüssel

(10) Patent No.: US 7,353,934 B2
(45) Date of Patent: Apr. 8, 2008

(54) METHOD AND APPARATUS FOR PICKING UP A PLASTIC PRODUCT

(75) Inventor: Richard Brüssel, Sulzfeld (DE)

(73) Assignee: Maschinenfabrik J. Dieffenbacher GmbH & Co., Eppington (DE)

( * ) Notice: Subject to any disclaimer, the term of this patent is extended or adjusted under 35 U.S.C. 154(b) by 143 days.

(21) Appl. No.: 10/623,708

(22) Filed: Jul. 22, 2003

(65) Prior Publication Data

US 2005/0042319 A1   Feb. 24, 2005

(30) Foreign Application Priority Data

Jul. 22, 2002   (DE) ................................ 102 33 299

(51) Int. Cl.
*B65G 17/00* (2006.01)
(52) U.S. Cl. ................ 198/468.6; 198/456; 198/470.1; 198/474.1; 198/468.01; 198/494; 294/119.1
(58) Field of Classification Search ................ 198/456, 198/470.1, 474.1, 468.01, 468.6, 494; 294/119.1
See application file for complete search history.

(56) References Cited

U.S. PATENT DOCUMENTS

| | | | |
|---|---|---|---|
| 4,015,872 A | | 4/1977 | Loznak et al. |
| 4,183,428 A | * | 1/1980 | McGill et al. ........... 198/470.1 |
| 4,750,605 A | | 6/1988 | Brems et al. |
| 5,088,592 A | * | 2/1992 | Palmers .................... 198/465.3 |
| 5,247,761 A | * | 9/1993 | Miles et al. ............. 47/1.01 R |
| 5,417,543 A | * | 5/1995 | Focke et al. ............. 414/796.9 |
| 5,449,063 A | * | 9/1995 | Thomas, Sr. ................ 198/834 |
| 6,074,163 A | * | 6/2000 | Yamazaki et al. ....... 414/795.5 |
| 6,209,709 B1 | | 4/2001 | Ouellette |
| 6,209,710 B1 | * | 4/2001 | Mueller et al. .......... 198/470.1 |
| 6,279,211 B1 | * | 8/2001 | Dischler ..................... 26/18.6 |
| 6,332,636 B1 | * | 12/2001 | Cohen et al. ............. 294/119.1 |
| 2001/0005518 A1 | * | 6/2001 | Fukuyama et al. ......... 425/409 |

FOREIGN PATENT DOCUMENTS

| | | |
|---|---|---|
| EP | 0 396 941 A2 | 11/1990 |
| EP | 0 450 482 A2 | 10/1991 |
| EP | 0 588 361 B1 | 3/1994 |
| JP | 60149410 | 6/1985 |

* cited by examiner

*Primary Examiner*—Gene O. Crawford
*Assistant Examiner*—Leslie A Nicholson, III
(74) *Attorney, Agent, or Firm*—Foley & Lardner LLP

(57) ABSTRACT

A method for picking up a plastic product lying on a conveyor belt, especially a tacky plastic product, for transport and for deposit in a mold in a molding press. The plastic product is picked up by one or more resilient carrier plates setting themselves resiliently on the longitudinal margins of the conveyor belt, and slipping between the product and the belt surface. An the apparatus for the practice of the method includes transversely movable carrier plates with which the plastic product is lifted by sliding under its lateral margins and is thereby picked up.

5 Claims, 2 Drawing Sheets

METHOD AND APPARATUS FOR PICKING UP A PLASTIC PRODUCT

BACKGROUND OF THE INVENTION

The invention relates to a method for picking up a plastic product, especially a tacky plastic, and to an apparatus for the practice of the method.

The more or less limp plastic product, depending on its fiber content, viscosity and thickness, has heretofore been handled automatically with needle grippers. The needles usually plunge vertically into the surface of the plastic or at an angle to the surface. In the vertical needle method the plastic adheres to the needles only by friction. Therefore a relatively large number of needles is necessary. In the case of plunging at an angle to the surface, the needles are usually in oppositely slanted pairs. Thus an interlocking clutching of the plastics is achieved. If then these needles are withdrawn in synchronism with one another, the position of the plastic remains centered.

In this needle manipulation of the plastics, marks are formed on the surface of the moldings. The reason is that, when the needles enter the plastic, tacky material has to be displaced. Therefore some plastic adheres to the usually cold needles and has to be removed again for the next plunge because otherwise the plunging force becomes ever greater and ever more material would adhere to the elevated portions. Therefore it is common to clean these needles with stripping sleeves as they are withdrawn. In that case the adhering plastic residues fall onto the surface of the plastic. This surface with the cooled plastic residues is, as a rule, the face side of the plastic. During the pressing operation these cooled plastic residues also remain on the upper side of the plastic, where they are visible as streaks or dots spoiling the surface.

It is furthermore the state of the art that the plastics are extruded or, when they are pressed, usually in the case of the back-pressing of decorative materials, they are processed by the strand-laying method. This method is to be understood to mean that the extruder or injection unit passes across the cavity of the press and deposits the melted, tacky material directly on the cavity. This solves the handling of the material, but the relatively great weight of the extruder also has to be moved and the melting power is reduced by the depositing process.

SUMMARY OF THE INVENTION

The invention is addressed to the problem of offering a method and creating an apparatus with which particularly tacky plastics can be brought into the mold press and deposited therein such that no or only very little marks will be made on the finished molding.

For the method, the solution consists in the fact that the plastic product is picked up by one or more resilient carrier plates resiliently settling on the longitudinal margins of the conveyor belt and, by transverse movement toward the longitudinal central axis (I-I), inserting themselves between the product and the belt surface.

The apparatus for the practice of the method includes an apparatus having transversely movable carrier plates (3) with which the plastic product is lifted by sliding under its lateral margins and thus picking it up.

With the method and the apparatus pursuant to the invention a substantial quality improvement is obtained, especially of the surfaces of the parts manufactured in a molding press.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF DRAWINGS

The accompanying drawings, which are incorporated in the constitute a part of the specification, illustrate presently preferred exemplary embodiments of the invention, and, together with the general description given above and the detailed description of the preferred embodiments given below, serve to explain the principles of the invention.

Additional advantageous features and embodiments of the subject of the invention will be found in the following description with the drawings, in which.

DETAILED DESCRIPTION OF PREFERRED EMBODIMENTS

Figure 1:
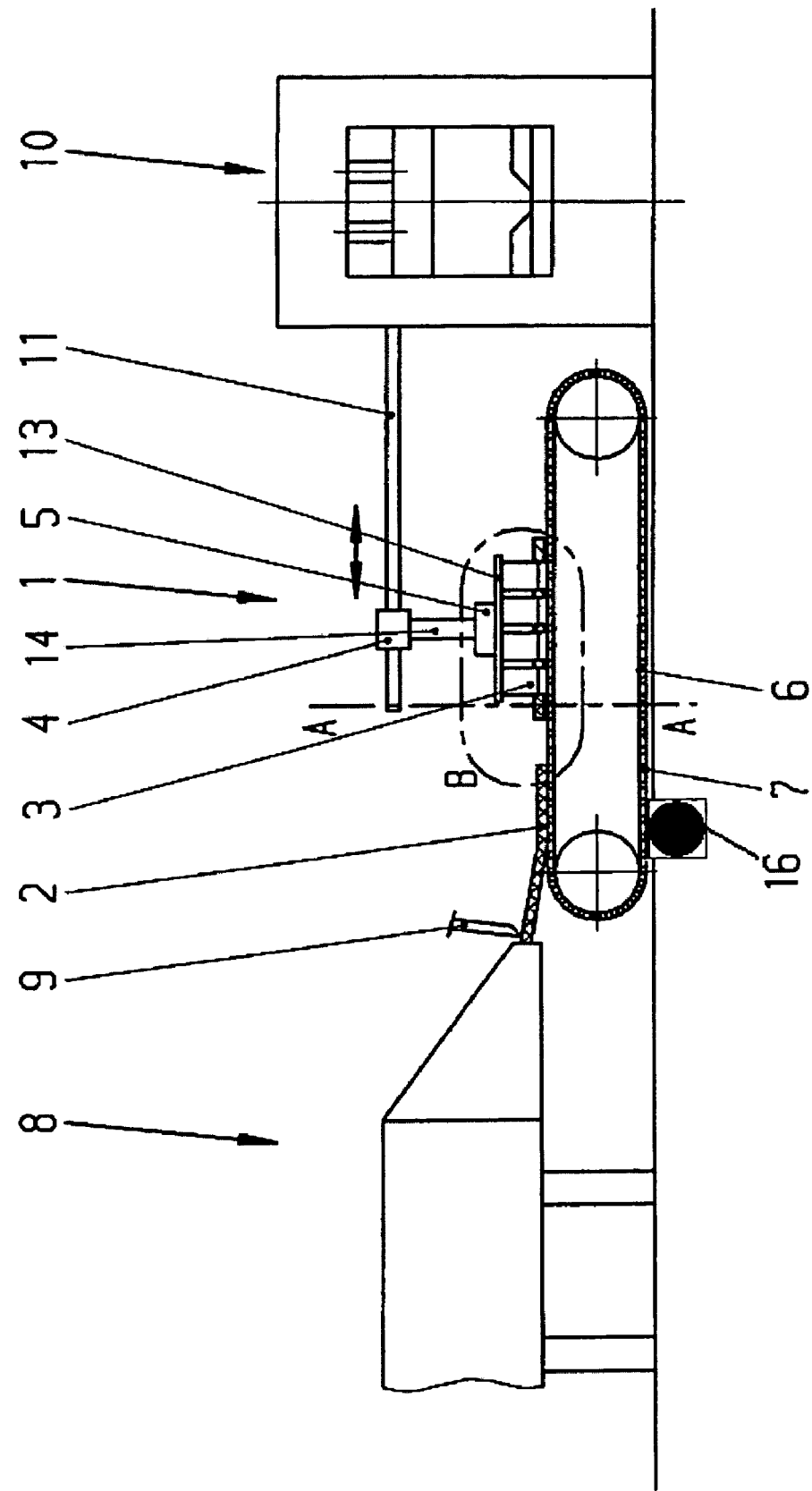
FIG. 1 shows the apparatus for the practice of the method in a side view, in an apparatus for the manufacture of moldings.
Figure 2:
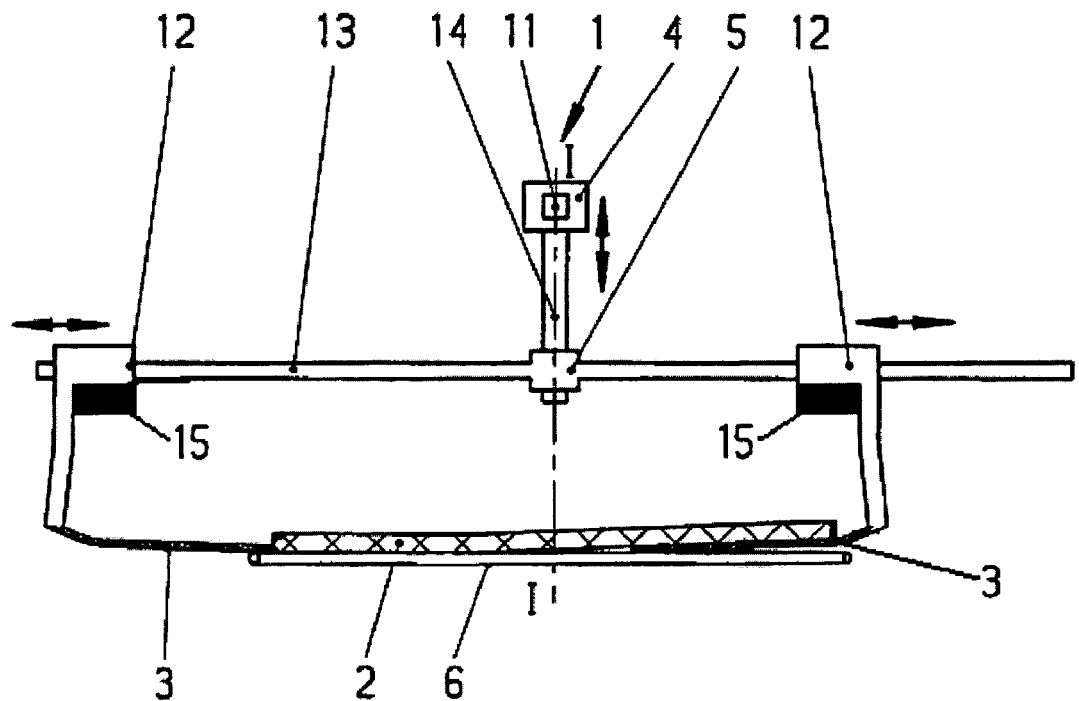
FIG. 2 shows the apparatus in a front elevation and in section A-A of FIG. 1.
Figure 3:
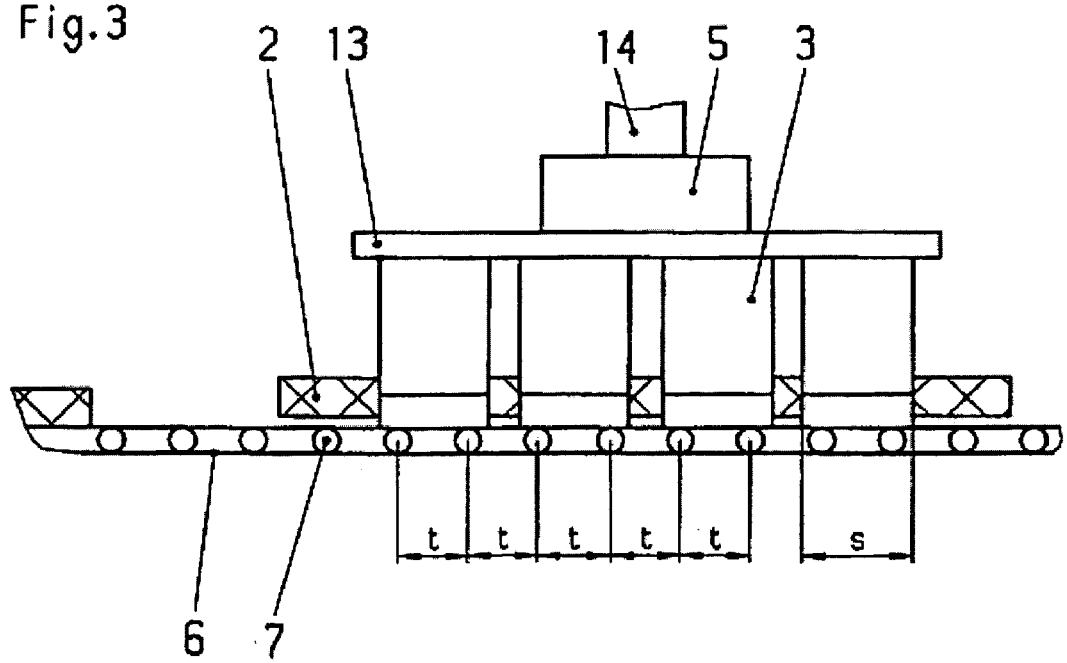
FIG. 3 shows the apparatus with the plastic product in a detail B of FIG. 1.

FIGS. 1 to 3 show the apparatus for the practice of the method in an imaginary system between an extruder 8 and a molding press 10. The plastic 2 comes from the extruder 8 in a strand, is divided into given lengths by a cutting mechanism 9 and laid upon the surface of an endless conveyor belt 6, in the form of a wire grating belt.

The plastic 2 is then peeled off and picked up by one or more resiliently flexible carrier plates 3 of spring steel on each longitudinal side by slipping under the two longitudinal margins of the conveyor belt 6. For that purpose the carrier plates 3 are mounted at a slight angle and can be driven by cross drives 12 across both longitudinal sides of the conveyor belt 6. The cross drives 12 are made to be moved back and forth across the longitudinal central axis I-I on the cross track 13.

As represented in FIG. 2, on the left of the longitudinal central axis I-I, the carrier plates 3 being lowered by the lift drive 5 on the lift spindle 14 settle resiliently on the surface of the conveyor belt 6 and press against it. When the cross drive 12 shifts transversely with respect to the longitudinal central axis I-I, as shown on the right in FIG. 2, the tips of the carrier plates 3 slip under the plastic 2, and the plastic 2 is picked up by the resiliently flexible carrier plates 3.

To carry the plastic 2 into the molding press the apparatus 1 is enabled to be driven by the drive 4 on a track 11. FIG. 3 shows, in a detail "B" of FIG. 1, the design of the carrier plates 3 of the width S, which must be greater than the spacing t of the wires 7 in the conveyor belt 6. Inasmuch as, in the apparatus of the invention, the plastic 2 does not have to be disturbed as in the case of the needles, but is only lifted up, the carrier plates become substantially less soiled. Moreover, the system is independent of the thickness of the plastic, i.e., even thin plastic 2 can be handled.

The cleaning of the carrier plates 3 can be integrated into the cross drive 12, in which case plastic residues become stripped away by a divided stroke. To save the weight of the cleaning system in the cross drive 12, it is possible to bring it cyclically or after X number of cycles into a special cleaning station and there to clean the carrier plates 3.

When the tacky plastic is scooped up, it can partially or fully adhere to the carrier plates, even though the conveyor belt 6 bears a TEFLON® coating. To prevent sticking, a provision is made for the surfaces of the carrier plates 3 to be treated with an appropriate parting agent such as talc or powdered chalk.

By repeated coating of the surface of the conveyor belt 6 with talc or other suitable powders the plastic 2 can be preventing from sticking to the conveyor belt. As a practical arrangement it is possible to coat the circulating conveyor belt with talc by means of a roller coating unit. For this purpose the carrier plates 3 passing under the plastic are for that purpose coated with talc cyclically or after x-number of cycles.

Talcum powder can be used as a coating agent because most of the plastic 2 used already contains it. A very slight surface coating is sufficient to prevent the sticking tendency. Thus the surfaces of the parts are affected but very little, that is, not adversely.

One preferred embodiment is a method for picking up a plastic product lying on a conveyor belt, especially a tacky plastic product, for transport and for depositing in a mold in a molding press, characterized in that the plastic product is picked up by one or more resilient carrier plates resiliently setting down on the longitudinal margins of the conveyor belt and slipping between the plastic and the belt surface.

Another preferred embodiment is an apparatus for picking up a plastic product, especially a tacky plastic, lying on a conveyor belt, for transport and for deposit in the mold of a molding press, for the practice of the method according to the embodiment of paragraph 0020, characterized in that an apparatus (1), includes transversely driven carrier pates (3) which slip under and lift the plastic (2) by its lateral margins and thereby pick it up.

Another preferred embodiment is an apparatus according to the embodiment of paragraph 0021, characterized by a resiliently flexible construction of the carrier plates (3) from spring steel.

Another preferred embodiment is an apparatus according the embodiments of paragraphs 0021 to 0022, characterized in that the carrier plates (3), for insertion underneath the plastic (2) can be urged slightly resiliently by means of a lifting drive (5) on a lifting spindle (14) against the surface of the conveyor belt (6) and can be driven toward the longitudinal central axis (1-1) on a cross rail (13).

Another preferred embodiment is an apparatus according to the embodiments of paragraphs 0021 to 0023, characterized by a slightly slanting application of the carrier plates (3) to the cross travel drives (12).

Another preferred embodiment is an apparatus according to the embodiments of paragraph 0021 to 0024, characterized by the attachment of a device 15 for cleaning the carrier plates (3) in the area of the cross travel drives (12).

Another preferred embodiment is an apparatus according to the embodiments of paragraphs 0021 to 0025, characterized in that the transporting of the plastic (2) can be performed on a track (11) by means of a drive (4).

Another preferred embodiment is an apparatus according to one or more of the embodiments of paragraphs 0021 to 0026, characterized in that a special cleaning device is provided for the carrier plates (3), in which the cross drives (12) are made for engagement with the carrier plates (3) cyclically or after x-cycles.

Another preferred embodiment is an apparatus according to one or more of the embodiments of paragraphs 0021 to 0027, characterized in that the bearing surfaces of the carrier plates (3) and/or of the conveyor belt (6) are provided with an appropriate parting coat.

Another preferred embodiment is an apparatus according to one or more of the embodiments of paragraphs 0021 to 0028, characterized in that the bearing surfaces of the carrier plates (3) and/or of the conveyor belt (6) are treated repeatedly with talc.

Another preferred embodiment is an apparatus according to one or more of the embodiments of paragraphs 0021 to 0029, characterized in that the circulating conveyor belt (6) can be coated with a parting agent in the bottom stretch by means of a roller coating unit 16.

Another preferred embodiment is an apparatus according to one or more of the embodiments of paragraphs 0021 to 0030, characterized in that the bearing surfaces of the carrier plates (3) and/or of the conveyor belt (6) can be treated with talc cyclically or after x-cycles.

Another preferred embodiment is an apparatus according to one or more of the embodiments of paragraphs 0021 to 0031, characterized in that the width (S) of one of the carrier plates (3) is made larger than the spacing (t) of the wires in the conveyor belt (6).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document here, DE 102 33 299.1 filed Jul. 22, 2002, is hereby incorporated by reference.

What is claimed is:

1. A method for picking up a freshly extruded tacky plastic product lying on a conveyor belt comprising:
   setting down on longitudinal margins of the conveyor belt one or more resilient carrier plates, wherein the carrier plates settle resiliently on a surface of the conveyor belt as the carrier plates press against the conveyor belt, and
   picking up the freshly extruded tacky plastic product by the one or more carrier plates by slipping the carrier plate or plates between the plastic product and the surface of the belt and peeling the plastic product off the surface of the conveyor belt.

2. The method according to claim 1, further comprising treating bearing surfaces of the carrier plates and/or of the conveyor belt repeatedly with talc.

3. The method according to claim 1, further comprising treating bearing surfaces of the carrier plates and/or of the conveyor belt with talc cyclically or after x-cycles.

4. The method according to claim 1, further comprising a step of cleaning the carrier plates in which plastic residues are stripped away in a cleaning device.

5. The method according to claim 1, further comprising a step of cleaning the carrier plates in which the carrier plates are cleaned cyclically or after a number of cycles.

* * * * *